Dec. 2, 1924.
E. H. DAUDELIN
PICKER FOR LOOMS
Filed Dec. 22, 1920
1,517,668
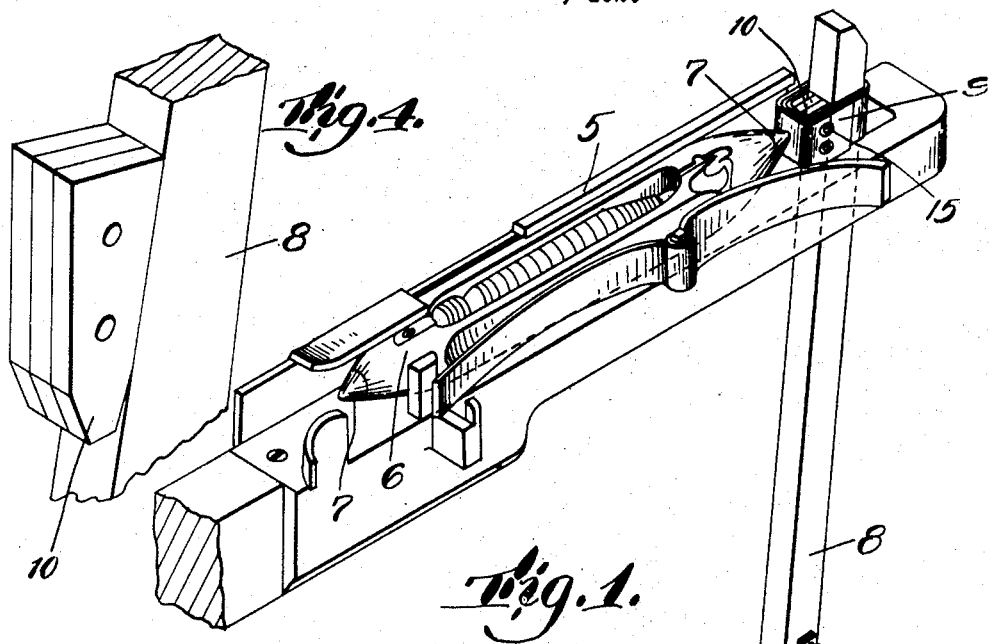
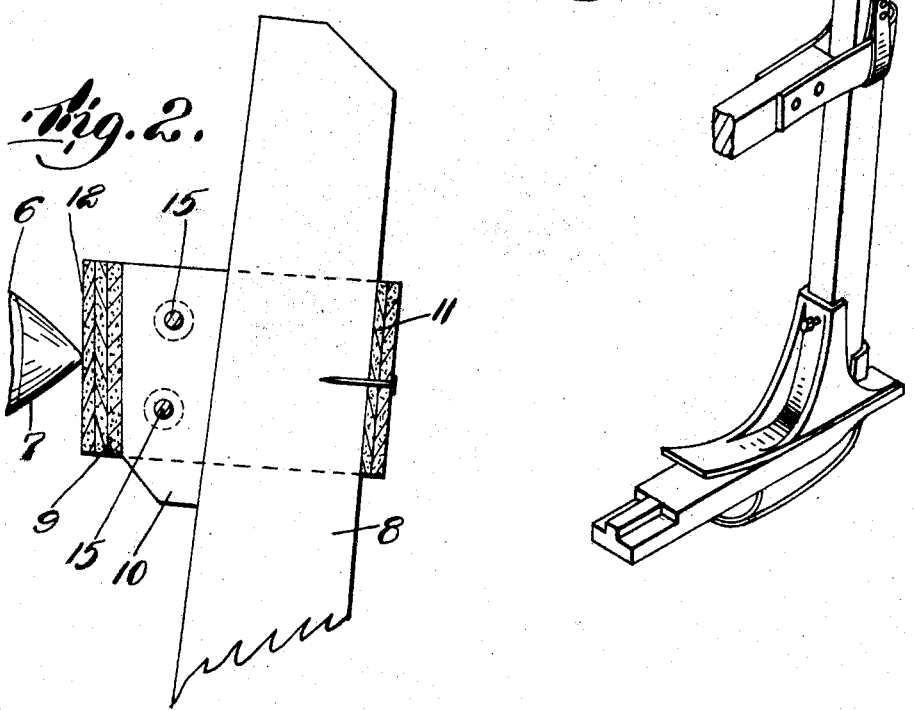
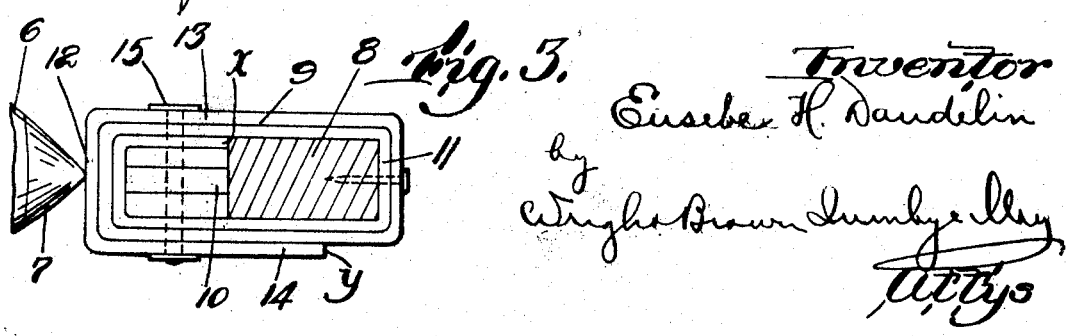
Inventor
Eusebe H. Daudelin
by Wright Brown Quinby Help
Attys Patented Dec. 2, 1924.

1,517,668

UNITED STATES PATENT OFFICE.

EUSEBE H. DAUDELIN, OF FALL RIVER, MASSACHUSETTS.

PICKER FOR LOOMS.

Application filed December 22, 1920. Serial No. 432,431.

*To all whom it may concern:*

Be it known that I, EUSEBE H. DAUDELIN, a citizen of the United States, residing at Fall River, in the county of Bristol and State of Massachusetts, have invented new and useful Improvements in Pickers for Looms, of which the following is a specification.

This invention has for its object to overcome certain troubles experienced in the operation of power looms.

It has heretofore been the practice to provide the picker stick with a picker of leather, for engaging the metal-shod pointed end of the shuttle and throwing it through the shed. Such pickers have consisted usually of a strap of appropriately tanned leather, which is wound in convolutions to provide several layers, pressed into approximately rectangular shape so as to be placed on the picker stick. A filler of leather is introduced between the stick and that end of the picker which receives the impact of the shuttle, and such filler is held in place by parallel spaced rivets which are passed through the picker. These parts are all formed, and secured together usually, before the picker is placed on and secured to the stick. The formation has been such, however, that the end face of the picker, which engages the shuttle, is parallel to the inner face of the picker stick (which is ordinarily rectangular in cross section), the filler being approximately oblong in shape. I have found by long experience that, as the picker stick is oscillated and the picker becomes worn, the socket, which is formed in the face thereof by the impact of the metal-shod end of the shuttle, is enlarged toward the top of the picker, and not only permits the shuttle to contact with the rivets in the picker so as to cut them, and itself become injured, but frequently the shuttle is mis-thrown and leaves the shed, with great danger to the operatives.

After prolonged study and experimentation, I have found that these difficulties may be overcome by so forming the picker that its operating face is at an acute angle to the longitudinal axis of the picker stick, that is, is in a plane which intersects the plane of the picker stick axis on a transverse line below the picker. The picker may be formed as ordinarily, except that the filler is wedge shape, so that, when the picker is placed or forced on the stick, the angularity of the operating face of the picker is secured.

Referring to the accompanying drawings,—

Figure 1 illustrates the shuttle box of a loom, a shuttle and a picker stick provided with my improved picker.

Figure 2 illustrates the picker stick with the picker in section.

Figure 3 represents a plan view of the picker, with the stick in section.

Figure 4 shows the picker stick and the filler, with the remainder of the picker removed.

On the drawing, I have shown a shuttle box 5 with a shuttle 6 therein, the latter having the usual metal-shod pointed ends 7. The stick 8 is mounted and oscillated by any convenient mechanism. The picker consists of a band 9 which is quadrilateral or oblong in plan view, and a filler 10. The band consists of a strap of leather or equivalent material which is coiled about an oblong form, the inner convolution terminating at $x$ and the outer convolution terminating at $y$, so that the multi-ply band thus formed has the inner and outer end walls 11, 12, and the side walls 13, 14. The band is longer than the front to rear thickness of the stick, and the space between the outer end wall of the band and the front face of the stick is filled with the spacer 10. This spacer consists of layers of leather of sufficient thickness to fill the space between the side walls of the band, as shown in Figure 3, this space being somewhat narrower than the width of the stick because of the termination of the inner convolution of the band at $x$. The filler is secured in place by spaced parallel rivets 15, 15, which are so located that the point of engagement of the shuttle with the outer face of the picker is midway between the rivets. Viewed in side elevation, the spacer is wedge shape with its faces converging downwardly at such an angle that, when the picker is at rest, the median line of the shuttle is perpendicular to the operating face of the front picker, as shown in Figure 2. With this construction, the metal-shod end of the shuttle wears or forms a socket in the picker, the point of the socket approaches the picker stick without deviating toward either of the rivets, and the rivets are not uncovered by the wearing away of the leather, I have also found that, all other conditions being equal, the shuttle is thrown back and forth through the shed, even though the picker becomes badly worn, without being discharged from its track in the lay, with greater accuracy than heretofore.

What I claim is:—

The combination with a shuttle and a picker stick, of a picker fixed to said stick in position to receive and stop the motion of said shuttle, said picker comprising an endless band enclosing said stick, a wedge shaped filler positioned smaller end down between said stick and the outer wall of said band whereby the shuttle striking face of said picker is substantially perpendicular to the shuttle when the picker is retracted, and parallel rivets passing from side to side of said band through said filler above and below the line of motion of the shuttle.

In testimony whereof I have affixed my signature.

EUSEBE H. DAUDELIN.